Dec. 2, 1941.   F. J. WESTROPE   2,264,603
VISOR STRUCTURE
Filed July 19, 1940
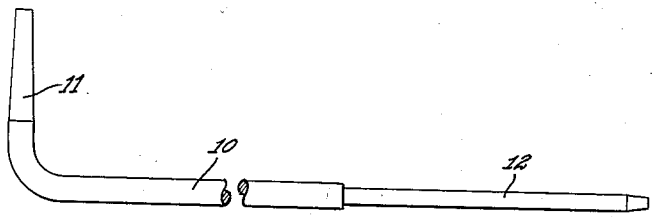
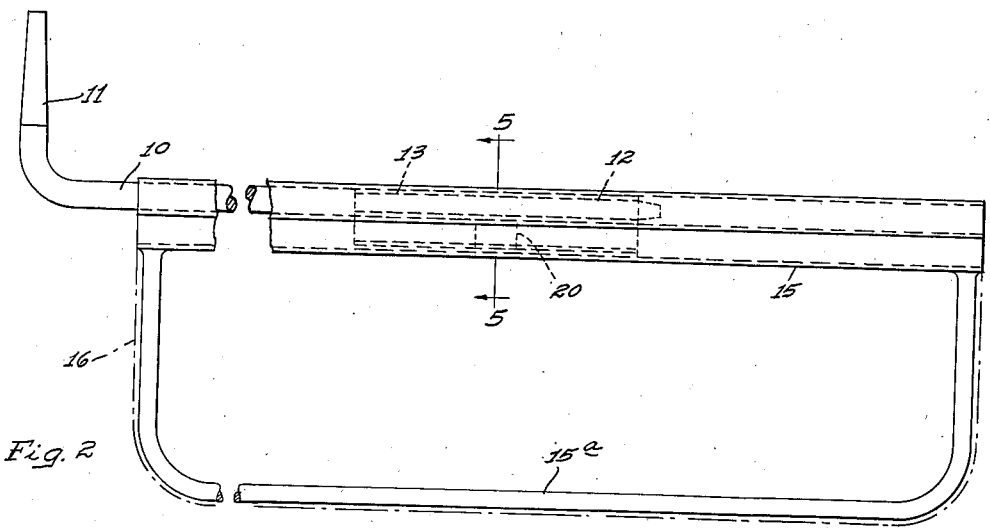
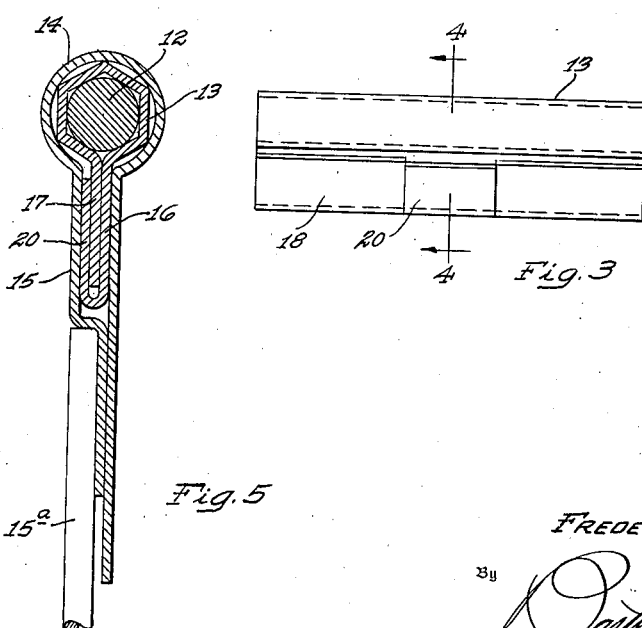
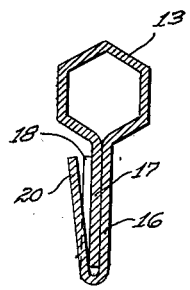
Inventor
FREDERICK J. WESTROPE
By
Attorneys Patented Dec. 2, 1941

2,264,603

UNITED STATES PATENT OFFICE 2,264,603

VISOR STRUCTURE

Frederick J. Westrope, Pleasant Ridge, Mich., assignor, by mesne assignments, to Reconstruction Finance Corporation, Detroit, Mich., a corporation of the United States Application July 19, 1940, Serial No. 346,394

4 Claims. (Cl. 296—97)

This invention relates generally to visors or glare shields and more particularly to visors or glare shields for motor vehicles.

An object of the present invention is to provide a new and improved visor structure of a character such that the shield thereof may be easily and readily moved about the axis of a supporting rod to desired positions of adjustment and may also be shifted along the rod to other desired positions of adjustment.

Another object of the invention is to provide a visor structure of the above mentioned character in which the shield will be frictionally held in the various positions of adjustment against rattling.

A further object of the invention is to provide a visor structure of the character described and yet one which is inexpensive to manufacture.

Other objects of the invention will become apparent from the following detailed description taken in connection with the accompanying drawing in which:

Fig. 1 is an elevational view of a supporting rod for the visor structure;

Fig. 2 is an elevational view of the visor structure shown mounted on its supporting rod;

Fig. 3 is a side elevational view of a friction holder for the visor structure;

Fig. 4 is an enlarged cross sectional view of the holder, taken along the line 4—4 of Fig. 3; and Fig. 5 is an enlarged cross sectional view of the visor structure, taken along the line 5—5 of Fig. 2.

Referring to the drawing by characters of reference, the visor structure includes a supporting rod 10 having a bent end portion 11 for attachment by a bracket (not shown) to a motor vehicle, such attachment usually being made to the windshield header panel of the vehicle body. The other or free end of the rod 10 is provided with a reduced portion 12 onto which is fitted a friction holder 13 of tubular form, preferably multi-sided, as shown in Figs. 4 and 5. The multi-sided member 13 is hexagonal, in the present instance, and prior to its being forced onto the reduced rod portion 12, the internal dimensions across flats of the hexagonal member are slightly less than the diameter of the reduced rod end portion 12. As a result, when the member 13 is forced onto the rod end portion 12, the sides of the hexagonal member 13 are slightly deformed outwardly thus insuring desired and continued friction between the parts such that the member 12 may be rotated on the rod and releasably held in any desired position by the frictional force therebetween.

A sheet metal shield supporting member is provided having a substantially tubular portion 14 which is slidably received on the rod 10 and having a channel-shaped portion 15 which, as shown in Fig. 5, is below and communicates with the tubular portion 14. The tubular portion 14 forms the top member of a frame 15ᵃ which may be covered by any suitable material, indicated at 16, to provide a panel or shield. The tubular portion 14 of the shield frame is slidable on the rod and relative to the holder or tensioned member 13 so that the shield may be shifted along the rod to desired positions of adjustment, thus providing an extensible visor as well as one which may be moved about the axis of its supporting rod to positions of adjustment.

The member 13 is preferably made of sheet metal and is provided with engaging downturned flanges 16 and 17, the flange 16 extending below the flange 17 and being bent back thereupon, as at 18, to provide an extended portion of the holder 13, which projects down into the channel-like portion 15 of the shield support. As shown, the said extended portion of the holder engages the opposed wall surfaces of the channel-shaped portion 15 but this fit between the extended portion and the channel-like portion is sufficiently loose so that the shield can be shifted along the rod 10.

In order to insure that the shield will remain in the position to which it may be shifted along the rod and also to insure against rattling noises, the upturned flange portion 10 is provided with an outwardly bent portion or spring finger 20 which is engaged and held under tension by the adjacent wall of the channel-like portion 15. It will be understood that the spring finger 20 is formed out of the flange portion 15 and is forced inwardly and placed under tension when the parts are assembled. This spring finger 20 under tension provides the necessary friction with the adjacent wall of the channel 15 to hold the visor frictionally in any position to which it may be shifted along the rod 10. It will be seen that when the visor panel is adjusted radially about the rod that it will be held frictionally in any position of adjustment by reason of the frictional force between the rod and the deformed hexagonal holder 13.

While I have shown and described my invention in some detail it is to be understood that the same is to be limited only by the appended claims for many changes may be made without departing from the spirit and scope of the invention.

What I claim is:

1. A visor structure comprising, a supporting rod having a reduced portion, a tubular member fitted onto said reduced portion in engagement therewith, said tubular member being movable about the axis of said rod and held by the friction with the rod in any desired position, a shield member supported by said rod and having a tubular portion fitted over said rod and over said tubular member, said shield member being shiftable along said rod relative to said tubular member to positions of adjustment, and means connecting said tubular member and said tubular portion for movement together about the axis of said rod and also for frictionally holding said tubular portion and said tubular member in relative adjusted positions.

2. A visor structure comprising, a shield carrying member having a tubular portion and having a channel-shaped portion, a supporting rod extending into said tubular portion and having a reduced portion within said tubular portion, a tubular member surrounding and contacting said rod reduced portion within said tubular portion, said tubular member having an extended portion within and contacting opposite side wall surfaces of said channel shaped portion to provide for rotation of said tubular portion and said tubular member together about the axis of said rod to desired positions of adjustment in which positions the shield is releasably held by the friction between said tubular member and said rod, said tubular portion and shield carried thereby being shiftable along said rod relative to said tubular member to other positions of adjustment and held in position by the friction between said extended portion and the inner wall surfaces of said channel-shaped portion.

3. A visor structure comprising, a supporting rod having a reduced portion, a shield carrying member having a tubular portion received on said rod and having a channel-shaped portion communicating with said tubular portion, a tubular member surrounding and engaging said reduced portion, said tubular member being movable about the axis of said rod and releasably held in positions of adjustment by the frictional force between the rod and said tubular member, said tubular portion and shield carried thereby being shiftable along said rod relative to said tubular member to other positions of adjustment, said tubular member having an extended portion within said channel-shaped portion, and means on said extended portion and held under tension by the opposite walls of said channel-shaped portion for frictionally holding said shield member in positions of adjustment along said rod.

4. A visor structure comprising, a supporting rod having a reduced end portion, a shield carrying member having a tubular portion received on said rod and having a channel-shaped portion communicating with said tubular portion, a multi-sided tubular member fitted onto said reduced rod portion, the internal distance across flats of said tubular member being slightly less than the diameter of said reduced portion prior to forcing of the tubular member onto said reduced portion, said tubular member being movable about the axis of said rod and releasably held in positions of adjustment by the frictional force between the rod and said tubular member, said tubular portion and shield carried thereby being shiftable along said rod relative to said tubular member to other positions of adjustment, said tubular member having an extended portion within said channel-shaped portion, and means on said extended portion and held under tension by the opposite walls of said channel-shaped portion for frictionally holding said shield member in positions of adjustment along said rod.

FREDERICK J. WESTROPE.